United States Patent Office 3,451,315
Patented June 24, 1969

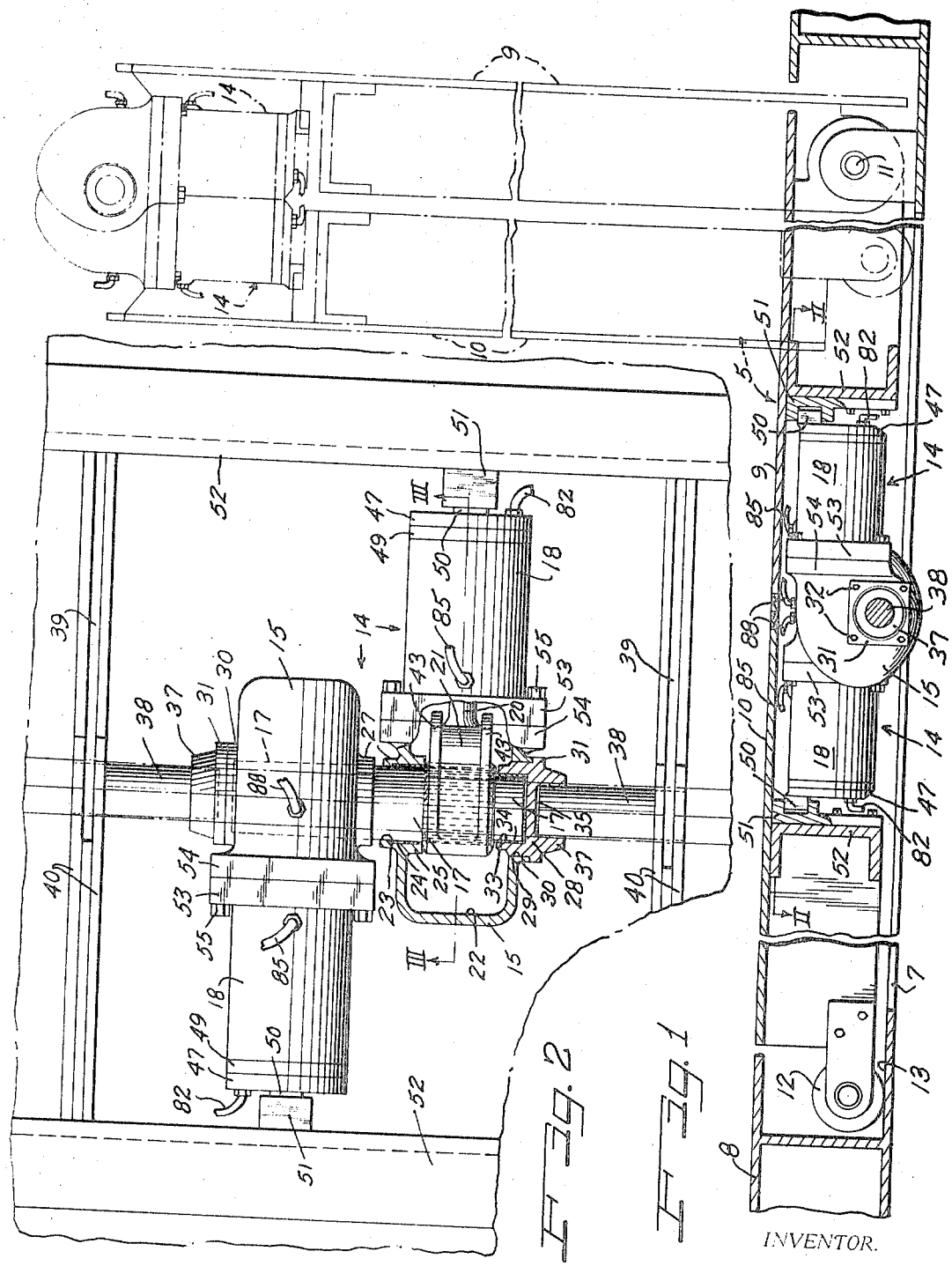

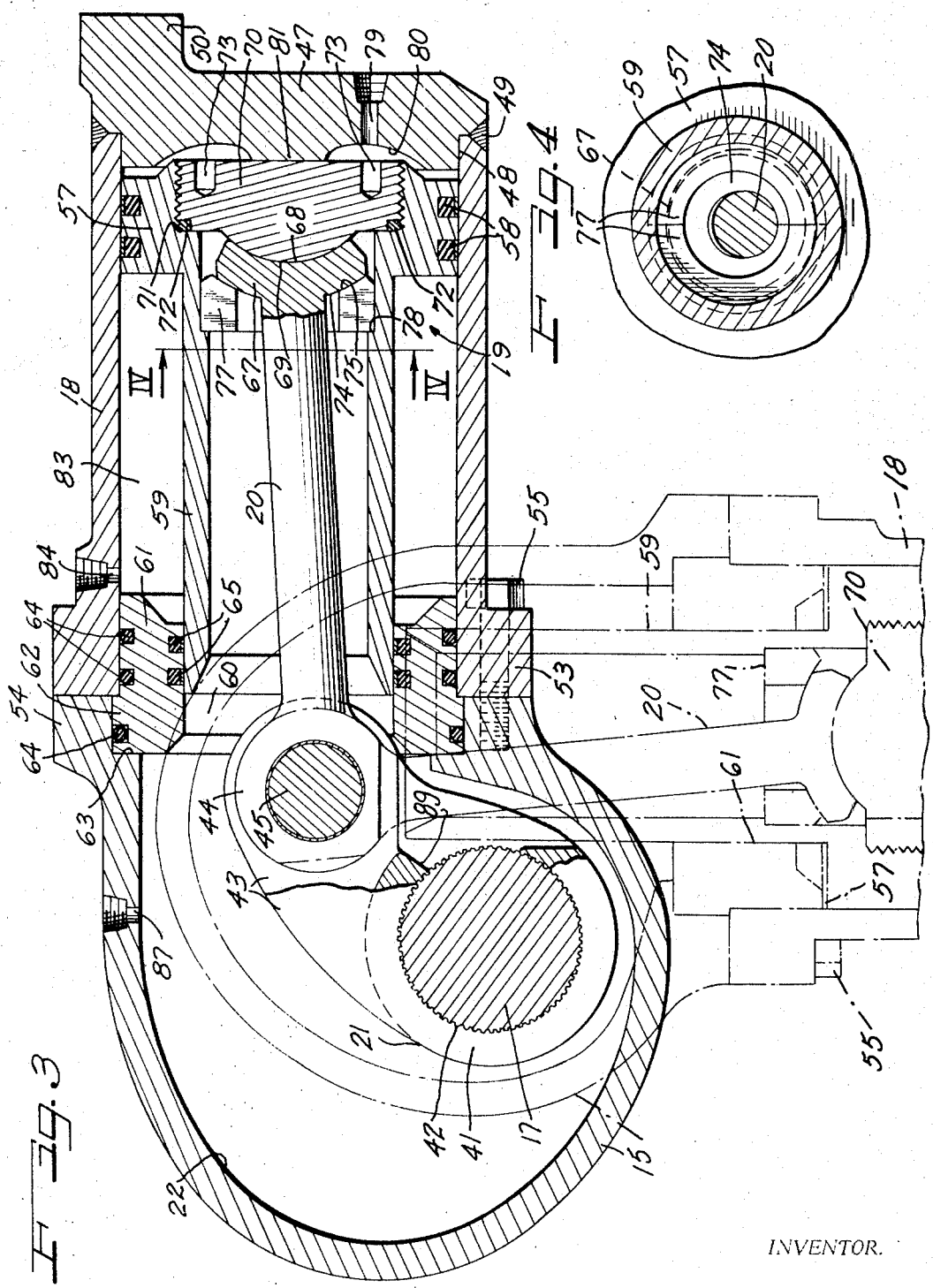

3,451,315
HOLLOW-PISTON ACTUATORS
Rollin Douglas Rumsey, Buffalo, N.Y., assignor to Houdaille Industries, Inc., Buffalo, N.Y., a corporation of Michigan
Filed Aug. 22, 1966, Ser. No. 574,024
The portion of the term of the patent subsequent to Nov. 29, 1983, has been disclaimed
Int. Cl. F01b 15/04, 9/00; F16j 15/8
U.S. Cl. 92—118                                    3 Claims

ABSTRACT OF THE DISCLOSURE

A piston lever actuator assembly comprises a hollow head portion and a lever cylinder portion with a closure and torque guide ring fixedly in the housing at juncture of the head and cylinder portion and slideably engaged by a tubular extension from a piston in the cylinder portion, with a link extending from the piston through the extension and connected to a rigid torque arm on a shaft on which the head is rotatably mounted.

---

This invention relates to novel piston lever actuator means for efficient power operation of relatively heavy closures such as hatch covers, doors, and the like, to move them between open and closed positions.

Highly desirable means for moving heavy duty closures such as hatch covers of cargo vessels, bulkhead doors, and the like, involving heavy movable panels or sections, comprise hydraulic rotary actuators of the piston lever type. A considerable problem has been encountered in such actuators in securing quality steel alloy castings free from porosity, slag inclusions, shrink pockets, cracks and the like which impair the bursting strength of the body or housing portions of the actuators. Hence such castings have been an excessive cost factor in actuators of this type.

Therefore, it is an important object of the present invention to improve the housing structures of piston lever type heavy duty rotary actuators.

Another object of the invenion is to provide an advantageous piston lever rotary actuator housing construction comprising an assembly of members in which low cost materials are usable in certain portions and a minimum of higher cost pressure resistant material in other portions.

A further object of the invention is to provide new and improved piston structure is piston lever rotary actuators.

Still another object of the invention is to provide a new piston lever rotary actuator construction having a novel connection between the piston and the connecting link with the torque arm of the actuator.

A still further object of the invention is to provide an improved piston lever rotary actuator which is operable in a shorter length than prior constructions.

Other objects, features and advantages of the present invention will be readily apparent from the following detailed description of a preferred embodiment thereof taken in conjunction with the accompanying drawings, in which:

FIGURE 1 is a generally schematic fragmental sectional elevational view showing a hatch cover installation embodying features of the invention;

FIGURE 2 is a plan view of the actuators and supporting framework of the hatch cover of FIGURE 1, taken substantially along the line II—II of FIGURE 1 and showing one of the actuators partially broken away to reveal details of structure;

FIGURE 3 is an enlarged longitudinal sectional view taken substantially on the line III—III of FIGURE 2; and FIGURE 4 is a fragmentary sectional detail view taken substantially on the line IV—IV of FIGURE 3.

Referring to FIGURE 1, a hatch cover assembly 5 is mounted for closing disposition over a hatchway or opening 7 within a ship's deck 8, or the like. In this instance, the hatch cover 5 comprises two complementary cover panel sections 9 and 10, with the section 9 pivotally mounted along one edge to the deck beam structure, as indicated at 11. On the other cover section 10, antifriction roller means 12 are mounted on its free end portion and arranged to ride track means 13 provided by the deck frame along the opening 7. Through this arrangement, the cover panel sections 9 and 10 are adapted to lie in coplanar side-by-side relation closingly over the hatchway 7, as shown in full outline in FIGURE 1, and are adapted to be moved into a folded, booked open position relative to one another and to the deck 8 as shown in dot-dash outline. Although the hatch cover 5 is shown as comprising only a pair of cover panels, the principles of this invention are adapted for multiples of such paired panels or sections for long hatchway openings. In addition, certain principles of the invention are adapted for operating single section closures such as hatch covers, and the like, between closed and open positions, as will be evident.

Powered hinge means are provided for actuating the cover sections 9 and 10 between the hatchway closing and the hatchway opening positions, and comprise a pair of rotary actuators 14 (FIGS. 1 and 2) mounted on the respective cover sections 9 and 10 and coupled for synchronized operation. Although a coupled pair of the actuators 14 is shown and may suffice for a hatch cover 10 which is relatively narrow, in a wider cover assembly a plurality of such pairs of actuators may be utilized along the hinge joint between the panels. Each of the actuators 14 is of the piston-lever rotary type.

In a rugged, lightweight, economical and efficient construction, each of the actuators 14 comprises a multipart body defining a hollow housing comprising a head portion 15 mounted for rotation about a shaft 17 and having extending linearly therefrom an actuating lever cylinder portion 18. Within the cylinder portion 18 is relatively reciprocably operatively mounted a torquing piston 19 (FIG. 3) connected by a piston rod link 20 to a torque lever thrust arm 21 mounted fixedly on the shaft 17.

Although each of the cooperatively paired actuators 14 may have a separate shaft 17, with the shafts secured in relatively fixed nonrotatable relation, a compact arrangement, as shown, has the shafts 17 joined as a common shaft for both of the actuators, with one of the actuators mounted on one half of the shaft associated with one of the actuators and the other half of the shaft associated with the remaining actuator of the pair. The construction and relationship and operation of the actuators 14 is such that by hydraulic motivation of the actuators to effect relative opposite swinging movements of the actuators about the shaft 17 opening or closing torque is selectively applied to the hatch cover sections 9 and 10.

In order to achieve optimum utilization of material for minimum weight and maximum strength, the head portion 15 of each of the actuators 14 is constructed in as nearly as practicable spherical hollow form. In the present instance, the head portion 15 of the actuator housing is not required to carry any hydraulic load and therefore it is feasible to make it from relatively low cost material, such as gray iron or ductile iron, in cast form and lending itself to easy machining. Within the head casting 15 is an ample chamber 22 to accommodate the torque arm 21 operatively. At that side of the head 15 which opposes the side of the head of the companion actuator 14, there is provided a journal bore 23 having therein a self-lubricating bushing bearing 24 and defined by a reinforcing hub flange 25 which extends inwardly and a counterpart hub flange 27 which extends outwardly.

At the opposite side of the head 15, it is provided with means affording a shaft bearing and closure as well as hinge pin coupling. For this purpose, a cap or closure member 28, which may be constructed as an economical casting or forging, fits closingly in a side opening 29 in the head 15 aligned with the journal bore 23 and defined by an outwardly projecting reinforcing flange 30 against which a lateral attachment flange 31 of the cap seats and is attached as by means of screws 32. Opening inwardly from within the cap 28 is a blind end journal bore 33 lined with a self-lubricating bearing bushing 34 within which the associated free end portion of the shaft 17 is journalled. Coaxial with the journal bore 33 is an outwardly opening blind end bore 35 defined by an outwardly extending annular flange 37 and providing a socket within which is engaged in torque-free relation one end portion of a hinge pin 38 extending coaxially with the shaft 17. At its other, outer end portion, the pin 38 couples respective hinge bars 39 and 40 rigid with the respective hatch cover sections 9 and 10.

Within the head chamber 22, the torque arm 21 is mounted on the shaft 17 to project upwardly and angled toward the cylinder 18, and for this purpose is provided with a hub eye 41 internally splined complementally to splines 42 provided therefor on the shaft, and maintained in alignment with a plane through the axis of the cylinder 18 between the inwardly projecting hub of the cap 28 and the opposite hub flange 25. Since the bearing supports for the shaft 17 are close to the sides of the torque arm 21, and of substantial length, the shaft is thoroughly supported against bending stresses.

In the present instance, the torque arm 21 is provided with a bifurcation defined by coextensive spaced parallel integral ears 43 between which an eye head 44 on the connecting rod link 20 is pivotally connected by a suitable pin 45.

Substantial advantage accrues from confining all high internal hydraulic pressures to the cylinder 18. For this purpose, the cylinder comprises a high burst strength tube which may be made from a low cost, high strength steel tubing piece such as commercially available straight steel pipe suitably honed on its inside cylindrical surface for cooperation with the piston. Alternatively, it may be fabricated as a centrifugally cast steel member which will enable casting in one piece therewith certain other associated parts. On its outer end, the cylinder 18 is closed by an end closure 47 capable of withstanding high internal pressures. While the closure 47 may be integrally cast with the cylinder 18, it is shown as comprising a separately formed cap which may be a forged piece if desired and of an outside diameter at least equal to that of the outside diameter of the cylinder 18, with a rabbit groove 48 receptive of the end portion of the cylinder in generally telescoped relation, welding 49 permanently securing the cap to the cylinder in sealed relation. On its upper central portion, the closure cap 47 has a preferably square cross section rugged integral boss 50 projecting rearwardly into a complementary socket in a bracket 51 secured to a frame beam 52 of the associated hatch cover section.

At its opposite end, adjacent to the head portion 15, the cylinder 18 is provided with a suitable laterally outwardly extending attachment flange 53 which may be separately formed and welded thereto or, as shown, comprise an integrally cast part of the cylinder. This attachment flange abuts a complementary integral attachment flange 54 on the head member 15 about the opening therein which communicates with the interior of the cylinder 18. While these flanges may be welded together, they are desirably secured by means of screws 55 which will enable separation of the head and lever portions of the assembly for access to the internal machanism including the piston 19 for servicing, if required.

Desirably, the piston 19 has dual diameter torque stabilizing portions. This includes a larger diameter head 57 coacting in reciprocably slidable relation with the inner cylindrical wall of the cylinder 18 and provided in its perimeter with spaced annular dynamic piston ring seals 58. Preferably, the piston head 57 is as short as may practically be utilized consistent with the torque stresses which must be met in operation. Extending inwardly toward the head chamber 22 from the piston head 57 is a stabilizing substantially smaller diameter tubular skirt extension 59 which is slidably reciprocably engaged within a complementary cylindrical concentric torque guide surface 60 of a combination closure and torque stabilizing cylinder ring member 61 mounted within and across the joint between the attachment flanges 53 and 54. While the ring 61 may be constructed integrally with the head member attachment flange 54 it is desirably constructed, as shown, as a separately formed piece which is telescopically engaged within the inner end portion of the cylinder 18 and has a laterally outwardly projecting annular locating flange 62 clamped by the inner margin of the attachment flange 53 into a rabbet seating groove 63 formed in the inner margin of the attachment flange 54. Static sealing rings 64 seal the opposing joint surfaces between the ring 61 and the flanges 53 and 54, respectively. Dynamic piston or shaft sealing rings 65 in an axially spaced relation within the ring cylinder 60 engage the cylindrical outer surface of the piston skirt 59.

Desirably, the connecting rod 20 is pivotally attached to the piston 19 in a novel manner avoiding the use of the usual wrist pin. To this end, the piston head 57 is desirably constructed in generally ring form either integrally with the skirt extensions 59, as shown, or as a separately formed and attached piece with respect to the skirt, if desired. Interiorly the skirt 59 is of ample diameter to accommodate operative rocking movements of the connecting rod 20.

On its outer end, the connecting rod 20 is provided with an integral swivel head 67 in the form of a concave convex flange providing a concave semispherical end face 68 engaging a complementary convexly semispherical bearing surface 69 on a thrust head plug member 70 which is threadedly engaged into a suitable rabbet groove 71 provided in the outer end portion of the inside perimeter of the piston head 57 and thrusting against a rearwardly facing shoulder defined at the inner end of the groove, a sealing ring 72 sealing the joint against leakage. Wrench sockets 73 in the outer end of the member 70 facilitate the assembly operation.

On its inner or back convex bearing surface 74, the rod head 67 slidably engages a complementary concave bearing surface 75 on a bearing thrust ring 77. To facilitate assembly, the ring 77 is desirably constructed as a two-part split ring (FIGS. 3 and 4) seated concentrically within the skirt 59 on an outwardly facing shoulder 78.

High pressure hydraulic operating fluid is introduced into the cylinder 18 between the end closure 47 and the crown of the piston head 57 through a passage 79 in the end closure and cmmunicating at its inner end with an annular clearance groove 80 about a central stop boss 81 opposing the thrust plug 70. At its outer end, the passage 79 is connected with a conduit 82 (FIGS. 1 and 2) which communicates with a suitable source of hydraulic pressure in a hydraulic control system to effect pressurized separation between the end closure 47 and the piston head 57 to operate the actuator for opening of the associated hatch cover, and, alternatively, for drainage during closing of the hatch cover.

Hydraulic pressure fluid for effecting return or closing movement of the hatch cover assembly by action of the actuators 14 is introduced into a working chamber 83 defined within the cylinder 18 between the back of the piston head 57 and the closure ring member 61 and the skirt extension 59. Conveniently this is effected through a suitable port or passage 84 extending through the wall of the cylinder 18 closely adjacent to the closure ring 61 and connected with the hydraulic control system through a hydraulic conduit 85. Thereby, on introduction of hydraulic pressure fluid into the chamber 83 the piston is returned toward the end closure 47, for closing the associated hatch cover, and during the hatch cover opening movement of the piston towar the closure ring 61, hydraulic fluid is bled off through the port 84. Hydraulic pressure in the chamber 83 may, however, be lower than the pressure in the working chamber between the piston and the end closure 47.

Any leakage past the closure ring 61 into the head chamber 22 is adapted to be drained off through a drain port 87 in the lead 15 and into a bleed-off conduit 88. In order to gain lubricating advantage from such leakage fluid in the head chamber 22, the drain-off port 87 is desirably in the top of the head 15.

In operation, because the torque arm 21 in each of the actuators 14 is fixed on the shaft 17, high pressure operating hydraulic fluid force introduced into the working chamber between the piston head 57 and the closure 47 generates a cranking torque between the cylinder 18 and the piston 19 for opening the associated closure. In the fully folded, booked relationship of the cover panel sections 9 and 10, as seen in dot-dash outline in FIGURE 1, the actuator housing assumes the position shown in dot-dash outline in FIGURE 3 relative to the shaft 17 and the torque arm 21, namely, a substantially 90° position as compared to the closed cover position shown in full outline. To accommodate the inner end portion of the skirt extension 59 in the fully downwardly turned relative position of the actuator housing, the adjacent portion of the torque arm hub 41 and the ear flanges 43 is provided with a suitable clearance recess 89.

Since the actuators 14 are in opposed relation, and the torque arms 21 extend generally upwardly and rearwardly in each of the actuators, the hydraulic pressure acting on the crown ends of the respective piston head 57 and the opposed end closures 47 forces them apart and causes the actuators to move in generally jackknifing relation about the shaft 17 with a consequent upward thrust of the shaft to cause the hatch cover panel sections 9 and 10 to jackknife or hook correspondingly and move into the open position indicated in dot-dash outline in FIGURE 1. Upon release of the cover opening pressure and pressurizing the return or closing motivation pressure chamber 83 within the cylinder 18, return or closing movement of the hatch cover sections through the action of the actuators is effected.

It will be understood that variations and modifications may be effected without departing from the spirit and scope of the novel concepts of the invention.

I claim as my invention:

1. An actuator assembly of the character described, comprising:
   a hollow housing including a head portion and a cylinder portion;
   a shaft journalled in said head portion on an axis transverse to and offset from the axis of said cylinder portion;
   a torque arm in fixed laterally projecting relation on said shaft within said head portion and projecting in alignment with said cylinder axis;
   a connecting rod link pivotally connected at one end to the distal end portion of said arm;
   a piston having a head portion reciprocally slidable in the cylinder and pivotally connected to the opposite end of said link;
   a smaller diameter skirt rigidly concentric with and moving with the piston head portion and extending in spaced relation about said link;
   an outer end closure on the cylinder opposing the crown end of the piston head portion;
   a closure ring cylinder member closing the inner end of the cylinder about said skirt and slidably guiding the skirt and defining a working chamber with the opposing back end of the piston head portion and the skirt and the cylinder;
   means for alternately introducing pressure fluid between said piston head crown and the opposing end closure and into said working chamber to effect oscillating relative rotary movements of the housing and said shaft;
   said piston head portion and said connecting rod link having opposed semi-spherical thrust bearing surfaces affording connection therebetween;
   said connecting rod link having a head flange thereon providing the semispherical bearing surface thereof;
   said skirt having a shoulder therein opposing said link head flange in spaced relation;
   a split bearing ring mounted on said shoulder and thrustingly opposing said head flange;
   said piston head portion having an opening therethrough enabling assembly of said split bearing ring and said link therethrough;
   and a thrust plug secured in said piston head portion opening and having thereon the semispherical bearing surface of the head portion which opposes the semi-spherical surface of the head flange.

2. An actuator assembly of the character described, comprising:
   a hollow housing including a head portion and a cylinder portion;
   shaft journalled in said head portion on an axis transverse to and offset from the axis of said cylinder portion;
   a torque arm in fixed laterally projecting relation on said shaft within said head portion and projecting in alignment with said cylinder axis;
   a connecting rod link pivotally connected at one end to the distal end portion of said arm;
   a piston having a head portion reciprocably slidable in the cylinder and pivotally connected to the opposite end of said link;
   a smaller diameter skirt rigidly concentric with and moving with the piston head portion and extending in spaced relation about said link;
   an outer end closure on the cylinder opposing the crown end of the piston head portion;
   a closure ring cylinder member closing the inner end of the cylinder about said skirt and slidably guiding the skirt and defining a working chamber with the opposing back end of the piston head portion and the skirt and the cylinder;
   means for alternately introducing pressure fluid between said piston head crown and the opposing end closure and into said working chamber to effect oscillating relative rotary movements of the housing and said shaft between extreme limits and in one of which the inner end portion of said skirt closely approaches said shaft;
   and said torque arm having a clearance recess therein receptive of said inner end portion of said skirt in said one extreme limit of movement.

3. An actuator assembly of the character described, comprising:
   a shaft;
   a rigid torque arm on said shaft;
   a housing including a hollow head portion rotatably mounted on said shaft and enclosing said torque arm;
   a separate portion on the housing providing a cylinder opening into the head portion toward said torque arm and attached to said head portion at a separable joint;

a piston having a head reciprocably operative in the cylinder and including a tubular smaller diameter elongated stabilizer extension projecting toward said torque arm;

a connecting rod extending through said stabilizer extension and pivotally attached to said torque arm and to said piston;

one of said portions having an internal rabbet at said joint providing with the other of said portions an inwardly opening annular groove;

a closure and guide ring through which said stabilizer extension extends slidably and having a lateral flange engaged in said groove with said other of said portions clamping said flange in said rabbet whereby to fix said ring in the housing;

means for alternately oppositely impressing hydraulic fluid on said piston head to effect relative rotation of the housing and shaft;

said ring extending across said joint;

and fluid seals between said ring and said portions at both sides of said joint.

References Cited

UNITED STATES PATENTS

| | | | |
|---|---|---|---|
| 3,059,683 | 10/1962 | Atherton | 92—120 X |
| 247,813 | 10/1881 | Ericsson | 92—140 X |
| 399,524 | 3/1889 | Hamlin | 92—140 X |
| 2,409,842 | 10/1946 | Eaton | 92—165 X |
| 2,865,215 | 12/1958 | Bishop | 92—165 X |
| 3,132,568 | 5/1964 | Strader | 92—168 X |
| 3,288,202 | 11/1966 | Rumsey | 160—188 |

FOREIGN PATENTS

| | | |
|---|---|---|
| 111,584 | 9/1940 | Australia. |
| 372,817 | 3/1907 | France. |
| 396,407 | 8/1933 | Great Britain. |
| 442,006 | 1/1936 | Great Britain. |

MARTIN P. SCHWADRON, *Primary Examiner.*

IRWIN C. COHEN, *Assistant Examiner.*

U.S. Cl. X.R.

92—140, 165, 187, 191; 287—20